(12) United States Patent
Ito et al.

(10) Patent No.: US 8,096,669 B2
(45) Date of Patent: Jan. 17, 2012

(54) SURFACE LIGHT SOURCE DEVICE AND IMAGE DISPLAY APPARATUS

(75) Inventors: Atsushi Ito, Kanagawa (JP); Yoshiaki Kouyama, Tokyo (JP)

(73) Assignee: Sony Corporation, Tokyo (JP)

( * ) Notice: Subject to any disclaimer, the term of this patent is extended or adjusted under 35 U.S.C. 154(b) by 381 days.

(21) Appl. No.: 12/354,343

(22) Filed: Jan. 15, 2009

(65) Prior Publication Data

US 2009/0185364 A1 Jul. 23, 2009

(30) Foreign Application Priority Data

Jan. 23, 2008 (JP) ................. P2008-012574

(51) Int. Cl.
*F21V 5/02* (2006.01)

(52) U.S. Cl. ...... 362/97.2; 362/97.1; 362/626; 362/620; 362/97.3

(58) Field of Classification Search ........ 362/97.1–97.4, 362/309, 620, 626
See application file for complete search history.

(56) References Cited

U.S. PATENT DOCUMENTS

| | | | |
|---|---|---|---|
| 4,991,073 A * | 2/1991 | Levin ............................ | 362/309 |
| 5,161,041 A | 11/1992 | Abileah et al. | |
| 6,129,439 A * | 10/2000 | Hou et al. .................. | 362/626 |
| 7,364,341 B2 * | 4/2008 | Parker et al. ............... | 362/620 |
| 2003/0184993 A1 | 10/2003 | Yamada | |

FOREIGN PATENT DOCUMENTS

| | | |
|---|---|---|
| JP | 3 214501 | 9/1991 |
| JP | 2001-281424 | 10/2001 |
| JP | 2004-6256 | 1/2004 |
| JP | 2006-162827 | 6/2006 |
| JP | 2007-010707 | 1/2007 |
| JP | 2007-139961 | 6/2007 |
| JP | 2008-311032 | 12/2008 |

* cited by examiner

*Primary Examiner* — Anabel Ton
(74) *Attorney, Agent, or Firm* — Finnegan, Henderson, Farabow, Garrett & Dunner, L.L.P.

(57) ABSTRACT

A surface light source device includes a light source facing a reflective surface of a reflecting member, and a light-controlling member composed of a transparent material and disposed across the light source from the reflecting member in such a manner as to face the reflective surface, the light-controlling member guiding light emitted from the light source in a predetermined direction. The light-controlling member has on a surface thereof remote from the reflective surface projections arranged on a plane. The projections have profiles of at least one kind, each having a symmetry axis or a symmetry plane. The symmetry axes or the symmetry planes of the projections are tilted at a predetermined angle with respect to a direction in which the light controlling member faces the reflecting member.

9 Claims, 9 Drawing Sheets

SURFACE LIGHT SOURCE DEVICE AND IMAGE DISPLAY APPARATUS

CROSS REFERENCES TO RELATED APPLICATIONS

The present invention contains subject matter related to Japanese Patent Application JP 2008-012574 filed in the Japanese Patent Office on Jan. 23, 2008, the entire contents of which are incorporated herein by reference.

BACKGROUND OF THE INVENTION

1. Field of the Invention

The present invention relates to technical fields of surface light source devices and image display apparatuses. In particular, the present invention relates to a technical field for reducing the thickness of such a device and an apparatus and for suppressing nonuniformity in brightness thereof by providing projections having predetermined shapes, to a light-controlling member that controls light emitted from a light source.

2. Description of the Related Art

There are surface light source devices in which light sources such as cold-cathode fluorescent lamps (CCFLs) or light-emitting diodes (LEDs) are used for illumination. Such a surface light source device is used as an illumination device in which the light source serves as a direct illumination, or is included in an image display apparatus, such as a television receiver or a personal computer, in which the light source serves as a backlight illumination.

Examples of the image display apparatus include a liquid crystal display apparatus in which a liquid crystal panel serves as a display panel that displays an image.

Since the liquid crystal panel of the liquid crystal display apparatus is not a self-luminous display, the liquid crystal display apparatus includes a surface light source device having a light source that illuminates the liquid crystal panel from the rear side. In this case, the surface light source device is used as a backlight device that illuminates the liquid crystal panel from the rear side.

Surface light source devices used as backlight devices are classified into the following: a so-called side-edge device in which a light source is disposed on a lateral side of a light-guiding member that guides light emitted from the light source in a predetermined direction, whereby a display panel is illuminated; and a so-called direct-lighting device in which a light source is disposed on the rear side of a display panel and light emitted from the light source is directed toward the display panel.

Liquid crystal display apparatuses used as television receivers and liquid crystal display apparatuses of large sizes typically include direct-lighting backlight devices as surface light source devices, out of the importance of obtaining bright images.

In general, a surface light source device included in a liquid crystal display apparatus includes a diffusing member (a diffusing plate or sheet) facing the rear surface of a liquid crystal panel, and a reflecting member disposed on the rear side of the diffusing member.

For example, in the surface light source device, a plurality of fluorescent lamps, such as CCFLs, serving as light sources are arranged in a predetermined direction, and the diffusing member is disposed between the display panel and the fluorescent lamps. The diffusing member causes light emitted from the fluorescent lamps to be applied uniformly to the display panel by diffusing the light, thereby preventing the contours of the fluorescent lamps from being visible through the display panel to a user, that is, preventing the existence of the fluorescent lamps from being recognized as a lamp image.

The diffusing member, causing the light emitted from the light source to be uniformly applied to the liquid crystal panel, provides uniformity in brightness on a display screen of the liquid crystal panel.

In the liquid crystal display apparatus, when light is emitted from the light source, the emitted light is diffused by the diffusing member and is output therefrom to the rear surface of the liquid crystal panel on which an image is being displayed. The light of the light source is emitted not only toward the diffusing member but also toward the reflecting member. The light emitted toward the reflecting member is reflected by the reflecting member, enters the diffusing member, is diffused by the diffusing member, and is applied to the liquid crystal panel.

In recent years, there has been an increasing demand that liquid crystal display apparatuses such as the one described above be thinner. If it is attempted to reduce the thickness of such an apparatus by reducing the interval between the light source and the diffusing member, a problem arises in that the existence of lamps may be recognized as a lamp image, as described above.

To avoid this, there is a surface light source device in which a light-controlling member called a prism array is disposed between a light source and a diffusing member. In this device, light emitted straight ahead from the light source is reflected by the light-controlling member in such a manner that the brightness at a region directly in front of the light source is reduced, whereby the occurrence of a visible lamp image is suppressed while the thickness of the device is reduced.

In the surface light source device described above, although prevention of the occurrence of a visible lamp image and reduction of the device thickness can be realized simultaneously, the brightness at a region directly in front of the light source is reduced too much, whereas the brightness near the region directly in front of the light source increases. This leads to a problem in that nonuniformity in brightness increases.

Figure 9:
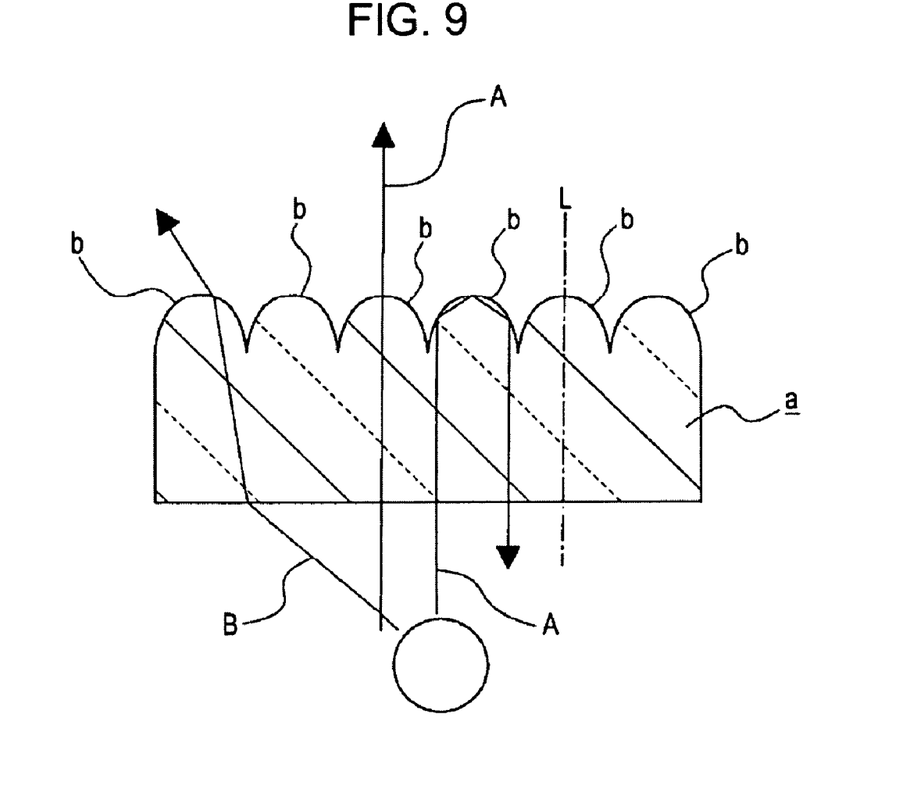
FIG. 9 shows exemplary light paths in a related-art surface light source device.

To avoid this, referring to FIG. 9, a surface light source device disclosed in Japanese Unexamined Patent Application Publication No. 2006-162827 includes a prism array (light-controlling member) a having prisms b of oval semi-cylinder shape. In this device, some of light A incident on the prism array a in a direction of a normal L (the thickness direction of the prism array a) is transmitted therethrough, whereas most of light B incident on the prism array a at an oblique angle with respect to the normal L is transmitted therethrough. Thus, the amount of luminous flux of light that is output from the prism array a is made uniform. Consequently, nonuniformity in brightness is suppressed.

SUMMARY OF THE INVENTION

Figure 10:
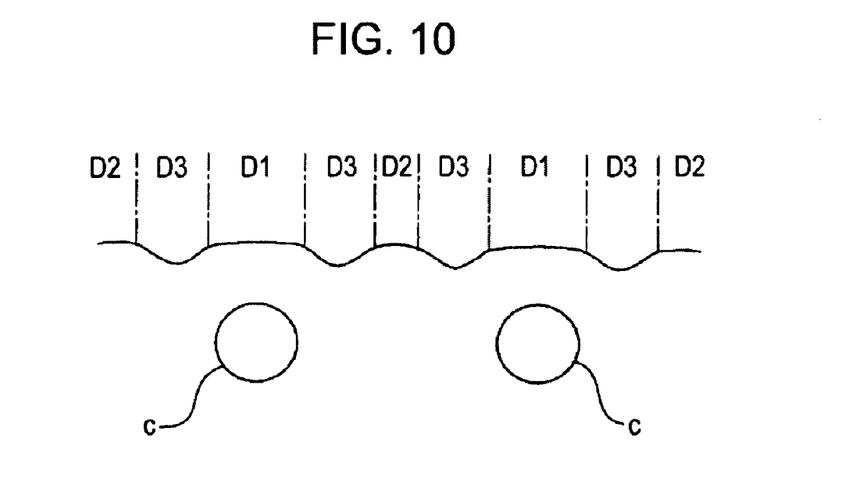
FIG. 10 shows a problem in the related-art surface light source device.

In the related-art surface light source device disclosed in Japanese Unexamined Patent Application Publication No. 2006-162827, referring to FIG. 10 showing the distribution of brightness, the amounts of luminous flux at regions D1 directly in front of light sources c and at regions D2 distant from the light sources c can be made uniform. However, at regions D3 adjoining the regions D1, the incident angle of light on the respective prisms (oval semi-cylinders) is small and therefore the transmittance is low. This reduces the amount of luminous flux of light incident on the regions D3 because of the intermediate distance from the light sources c.

That is, the brightness at the regions D3 becomes lower than the brightness at the regions D1 and the regions D2, degrading the uniformity in brightness.

To solve the problems described above, it is desirable to provide a surface light source device and an image display apparatus having smaller thickness and in which nonuniformity in brightness can be suppressed.

According to an embodiment of the present invention, a surface light source device includes a light source facing a reflective surface of a reflecting member, and a light-controlling member composed of a transparent material and disposed across the light source from the reflecting member in such a manner as to face the reflective surface, the light-controlling member guiding light emitted from the light source in a predetermined direction. The light-controlling member has on a surface thereof remote from the reflective surface projections arranged on a plane. The projections have profiles of at least one kind, each having a symmetry axis or a symmetry plane. The symmetry axes or the symmetry planes of the projections are tilted at a predetermined angle with respect to a direction in which the light controlling member faces the reflecting member.

Therefore, the brightness and transmittance near regions directly in front of the light source are improved. Consequently, the brightness at the regions directly in front of the light source and the brightness near the regions directly in front of the light source are made substantially uniform, whereby reduction of the thickness of the device and suppression of nonuniformity in brightness can be realized simultaneously.

In the surface light source device according to the embodiment, it is desirable that the predetermined angle at which the symmetry axes or the symmetry planes of the projections are tilted be 20 degrees or smaller. With such a configuration, the transmittance of light at certain regions of the projections is prevented from becoming too high. Thus, nonuniformity in brightness can be further suppressed.

In the surface light source device according to the embodiment, the predetermined angle at which the symmetry axes or the symmetry planes of the projections are tilted may include a plurality of different angles varying with positions at which the projections reside. With such a configuration, precise control of light becomes possible and therefore nonuniformity in brightness can be suppressed.

In the surface light source device according to the embodiment, the light source may be a light-emitting diode or a fluorescent lamp. With such a configuration, the range of options for the light source is widened, enabling highly flexible optical design utilizing various characteristics of such light sources.

In the surface light source device according to the embodiment, the light source may include a plurality of stick-like light sources extending in a predetermined direction, the plurality of light sources may be arranged in a predetermined direction, and the projections of the light-controlling member may each extend in the predetermined direction in which the light sources extend. With such a configuration, the control of light with the light-controlling member can be realized more easily.

In the surface light source device according to the embodiment, the light source may include a plurality of point light sources arranged in a grid pattern, and the projections of the light-controlling member may be each of substantially conical shape and be arranged on the plane. With such a configuration, reduction of the thickness of the device and suppression of nonuniformity in brightness can be realized simultaneously also in a case where point light sources are used.

In the surface light source device according to the embodiment, it is desirable that the light-controlling member be resistant to ultraviolet light contained in the light emitted from the light source. With such a characteristic, deterioration of the light-controlling member due to ultraviolet light can be suppressed.

It is desirable that the surface light source device according to the embodiment further include a diffusing member diffusing the light emitted from the light source, the diffusing member being disposed across the light-controlling member from the light source. With such a configuration, the diffusivity of light is improved and nonuniformity in brightness can further be suppressed.

In the surface light source device according to the embodiment, it is preferable that the light-controlling member scatter the light emitted from the light source. With such a configuration, the directivity and the distribution of in-plane brightness of light that is output from the light-controlling member can be made uniform.

According to another embodiment of the present invention, an image display apparatus includes a display panel on which an image is to be displayed, a light source disposed on a side with respect to the display panel remote from a display surface of the display panel in such a manner as to face a reflective surface of a reflecting member, and a light-controlling member composed of a transparent material and disposed across the light source from the reflecting member in such a manner as to face the reflective surface, the light-controlling member guiding light emitted from the light source in a predetermined direction. The light-controlling member has on a surface thereof remote from the reflective surface projections arranged on a plane. The projections have profiles of at least one kind, each having a symmetry axis or a symmetry plane. The symmetry axes or the symmetry planes of the projections are tilted at a predetermined angle with respect to a direction in which the light controlling member faces the reflecting member.

Therefore, the brightness and transmittance near regions directly in front of the light source are improved. Consequently, the brightness at the regions directly in front of the light source and the brightness near the regions directly in front of the light source are made substantially uniform, whereby reduction of the thickness of the apparatus and suppression of nonuniformity in brightness can be realized simultaneously.

DESCRIPTION OF THE PREFERRED EMBODIMENTS

Embodiments of the surface light source device and the image display apparatus according to the present invention will now be described with reference to the accompanying drawings.

The embodiments described hereinafter concern a case where the image display apparatus and the surface light source device of the present invention are applied to a television receiver that displays an image on a liquid crystal panel and a surface light source device included in the television receiver, respectively.

The scope of the present invention is not limited to such a television receiver having a liquid crystal panel and a surface light source device included therein, and may be widely applied to any of other television receivers and image display apparatuses used with personal computers, and any of other surface light source devices included in such apparatuses.

Figure 1:
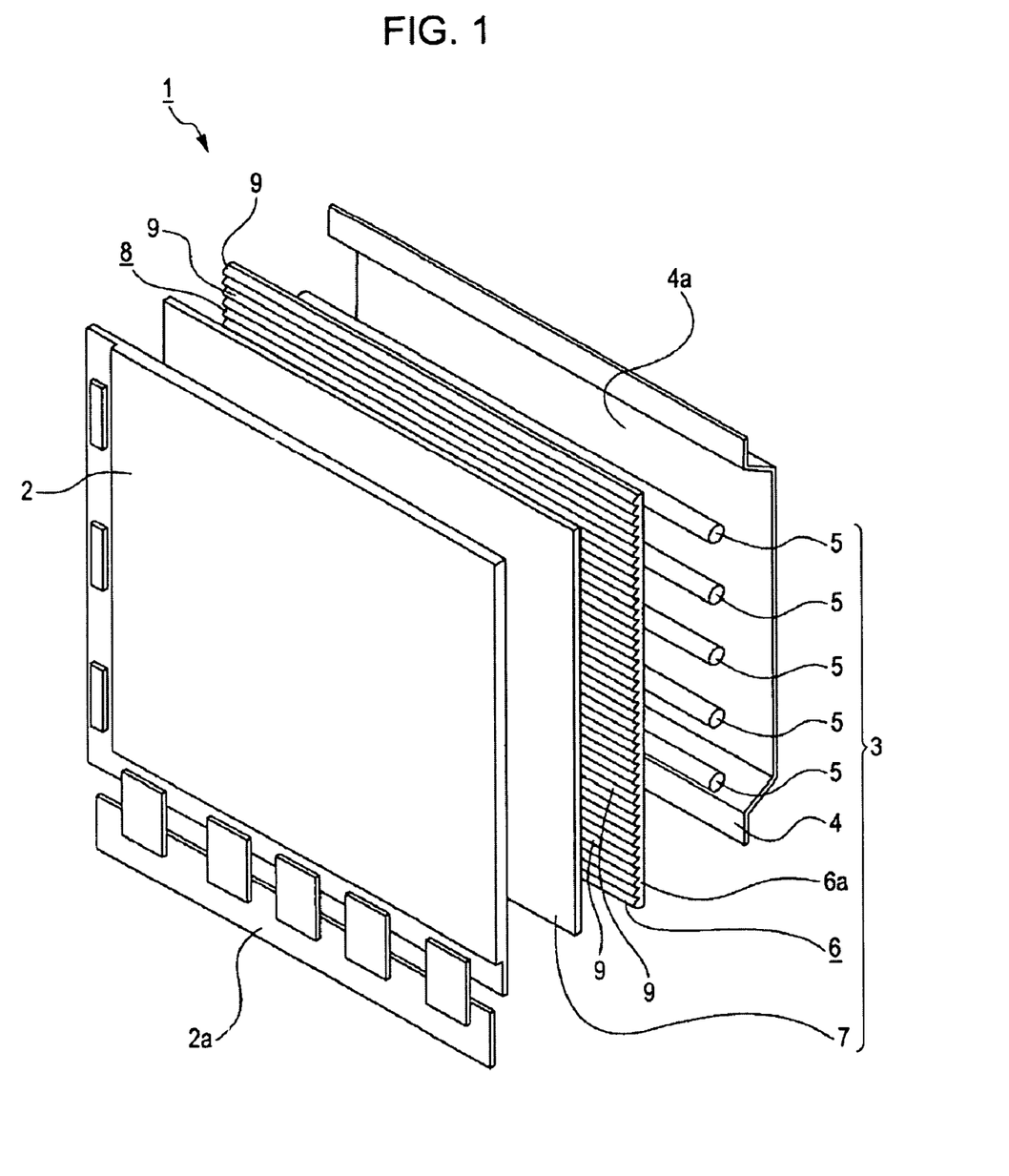
FIG. 1, in conjunction with FIGS. 2 to 8, shows an embodiment of the present invention, and is an exploded perspective view of an image display apparatus according to the embodiment.
Figure 2:
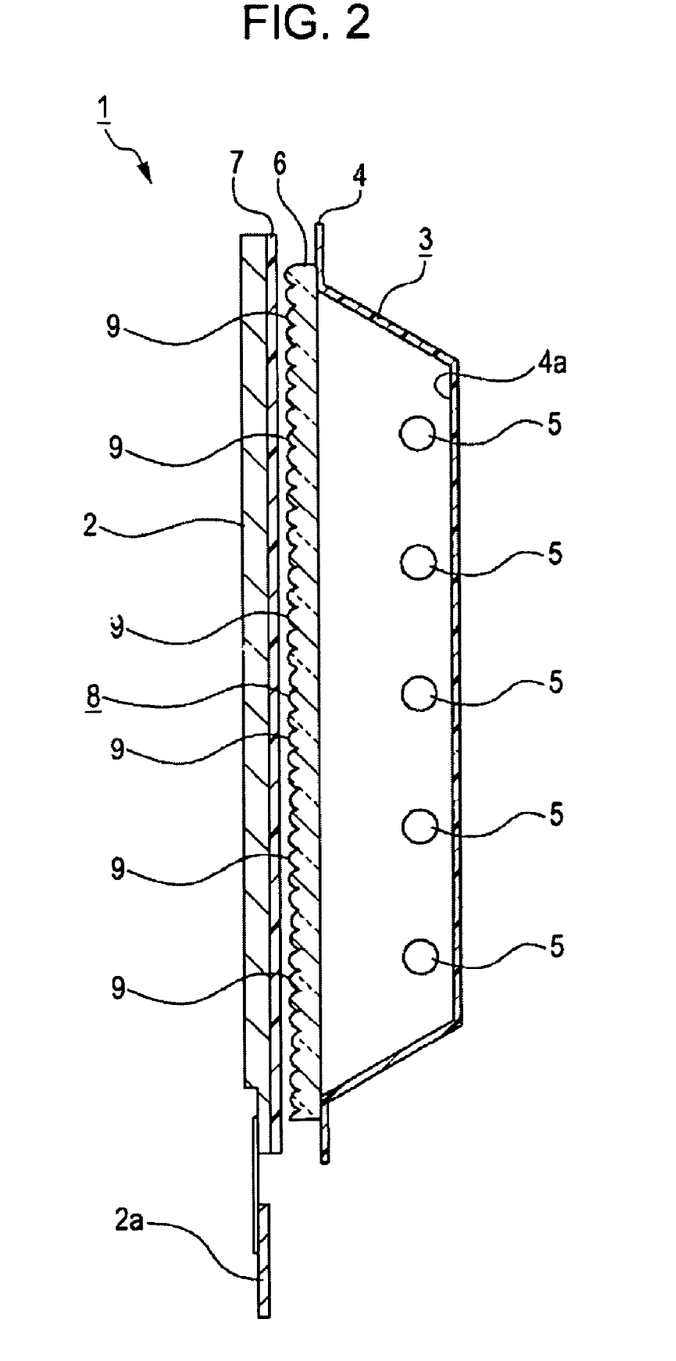
FIG. 2 is a cross-sectional view of the image display apparatus.

Referring to FIGS. 1 and 2, an image display apparatus (television receiver) 1 includes relevant elements housed in an outer casing (not shown).

The outer casing has a box-like shape having an open front and a small depth from the front to the rear. A display panel (liquid crystal panel) 2 that displays an image is disposed in such a manner as to close the open front from the inside. The display panel 2 includes, for example, a transmissive color liquid crystal panel held between two polarizing plates disposed on the front and the rear thereof, and is driven by an active-matrix method, thereby displaying a full-color image.

The display panel 2 is connected to a drive circuit 2a provided on the lower side thereof, for example. The drive circuit 2a is a circuit that controls driving of the display panel 2.

The outer casing houses a surface light source device 3. The surface light source device 3 includes a reflecting member 4, light sources 5, a light-controlling member 6, and a diffusing member 7. The reflecting member 4, the light sources 5, the light-controlling member 6, and the diffusing member 7 are disposed in that order from the rear. The diffusing member 7 faces the display panel 2.

The reflecting member 4 is composed of resin or metal colored in white or silver, for example, and is shaped like a plate. The front surface of the reflecting member 4 serves as a reflective surface 4a.

The reflecting member 4 reflects light emitted from the light sources 5 toward the display panel 2 and desirably has a reflectance of 90% or higher so that the utilization efficiency of the light emitted from the light sources 5 is improved.

The light sources 5 are disposed facing the reflective surface 4a of the reflecting member 4. The light sources 5 are cold-cathode fluorescent lamps (CCFLs), for example. The light sources 5 are not limited to CCFLs and may be any of other light sources such as hot-cathode fluorescent lamps, xenon lamps, and light-emitting diodes (LEDs).

The light sources 5 are each shaped like a long cylinder and are oriented in such a manner that the longitudinal direction thereof corresponds to the horizontal direction, for example. The light sources 5 are spaced apart from each other at a constant interval in the vertical direction. Longitudinal ends of the light sources 5 are held by respective lamp sockets (not shown).

The light-controlling member 6 is shaped like a thin rectangular plate, for example, and is disposed between the diffusing member 7 and the light sources 5. The light-controlling member 6 is composed of a transparent material such as acryl, polycarbonate, polystyrene, and glass.

The light-controlling member 6 guides the light emitted from the light sources 5 in a predetermined direction to the diffusing member 7, whereby the amount of luminous flux of light that is output from the diffusing member 7 toward the display panel 2 is made uniform. The state where the amount of luminous flux is made uniform means that light is output from the entirety of an output surface of the diffusing member 7 with a uniform or substantially uniform amount of luminous flux.

It is important that the light-controlling member 6 causes only a small bend in a state where the image display apparatus 1 is tilted. To provide a sufficient rigidity, in a case where the display panel 2 is of 32-inch size, the display panel 2 desirably has a thickness of 1 mm or larger.

The light-controlling member 6 is resistant to ultraviolet light. The light emitted from the light sources 5 contains an ultraviolet component. By providing the light-controlling member 6 with ultraviolet resistance, deterioration of the light-controlling member 6 can be suppressed.

The light-controlling member 6 having ultraviolet resistance can also suppress ultraviolet light from radiating outside the image display apparatus 1.

The light-controlling member 6 has a relief structure 8 on a surface thereof facing the diffusing member 7. The relief structure 8 includes ridges 9 on a plane 6a facing the diffusing member 7. The ridges 9 are arranged continuously in a direction in which, for example, the light sources 5 are arranged (i.e., the vertical direction).

The light-controlling member 6 receives the light emitted from the light sources 5 in such a manner as described below. The relief structure 8 causes part of the light received from the light sources 5 to be reflected thereinside and then to be guided toward the reflecting member 4. With such reflection of the light inside the relief structure 8, the amount of luminous flux of light emitted straight ahead from the light sources 5 can be reduced.

Figure 3:
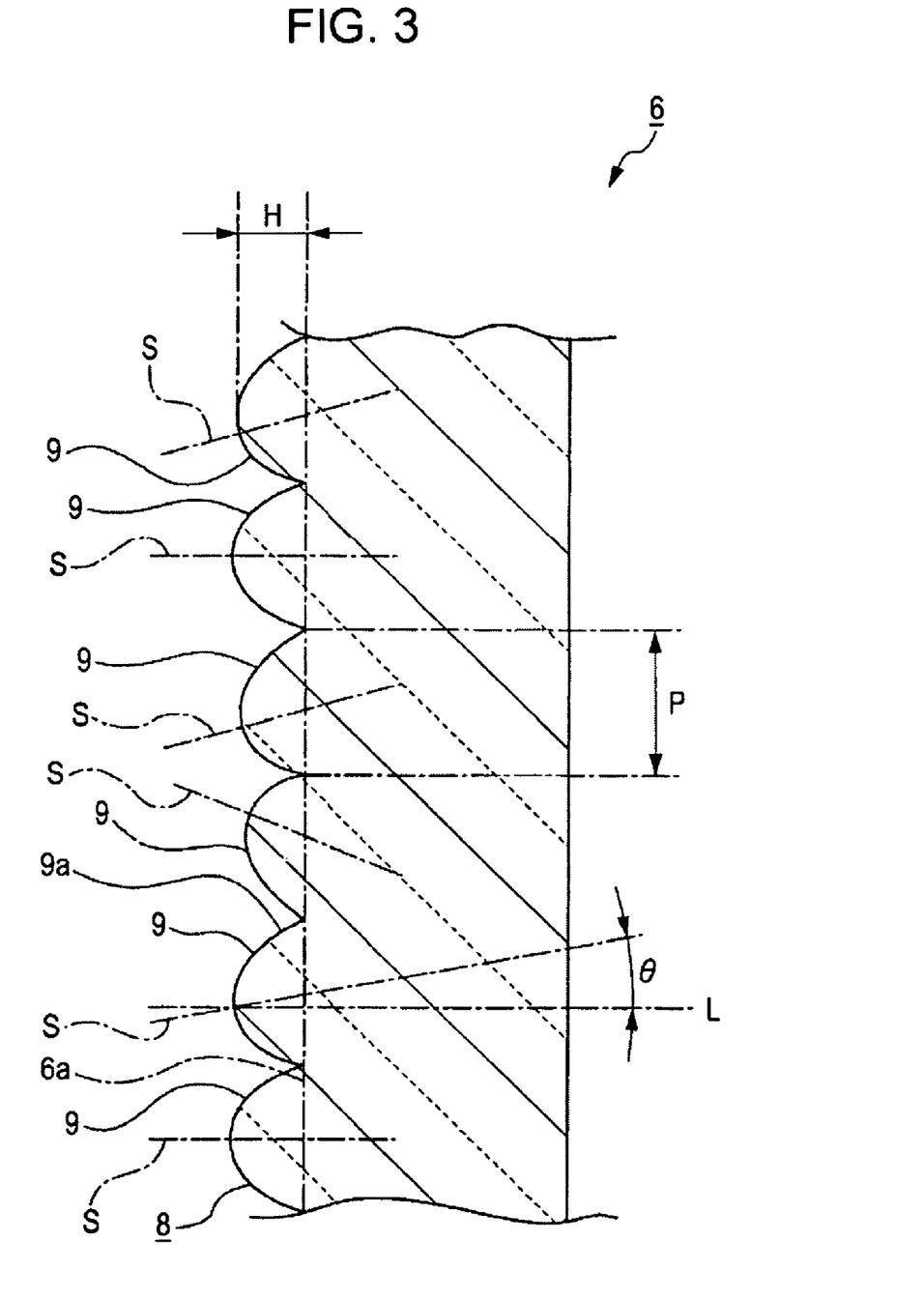
FIG. 3 is a conceptual diagram of an exemplary light-controlling member.

Referring to FIG. 3, the ridges 9 each have an oval profile or a parabolic contour, for example. The ridges 9 are not limited to be of oval or parabolic shape, and may have a substantially oval or parabolic contour obtained with a plurality of continuous straight lines or with a plurality of continuous straight and curved lines.

The ridges 9 have profiles of at least one kind, the profiles having respective symmetry planes S. At least one of the symmetry planes S is tilted at a predetermined angle θ with respect to a direction in which the light-controlling member 6 faces the reflective surface 4a, i.e., with respect to a normal L to the light-controlling member 6. If the angle θ is too large, the transmittance of light at sides 9a of the ridges 9 becomes high, increasing the probability of occurrence of nonuniformity in brightness. Therefore, the angle θ is desirably set to be 20 degrees or smaller, for example.

Referring to FIG. 3, the ratio of a height H to a pitch P of the ridges 9 is set to be about 0.7, for example.

Figure 4:
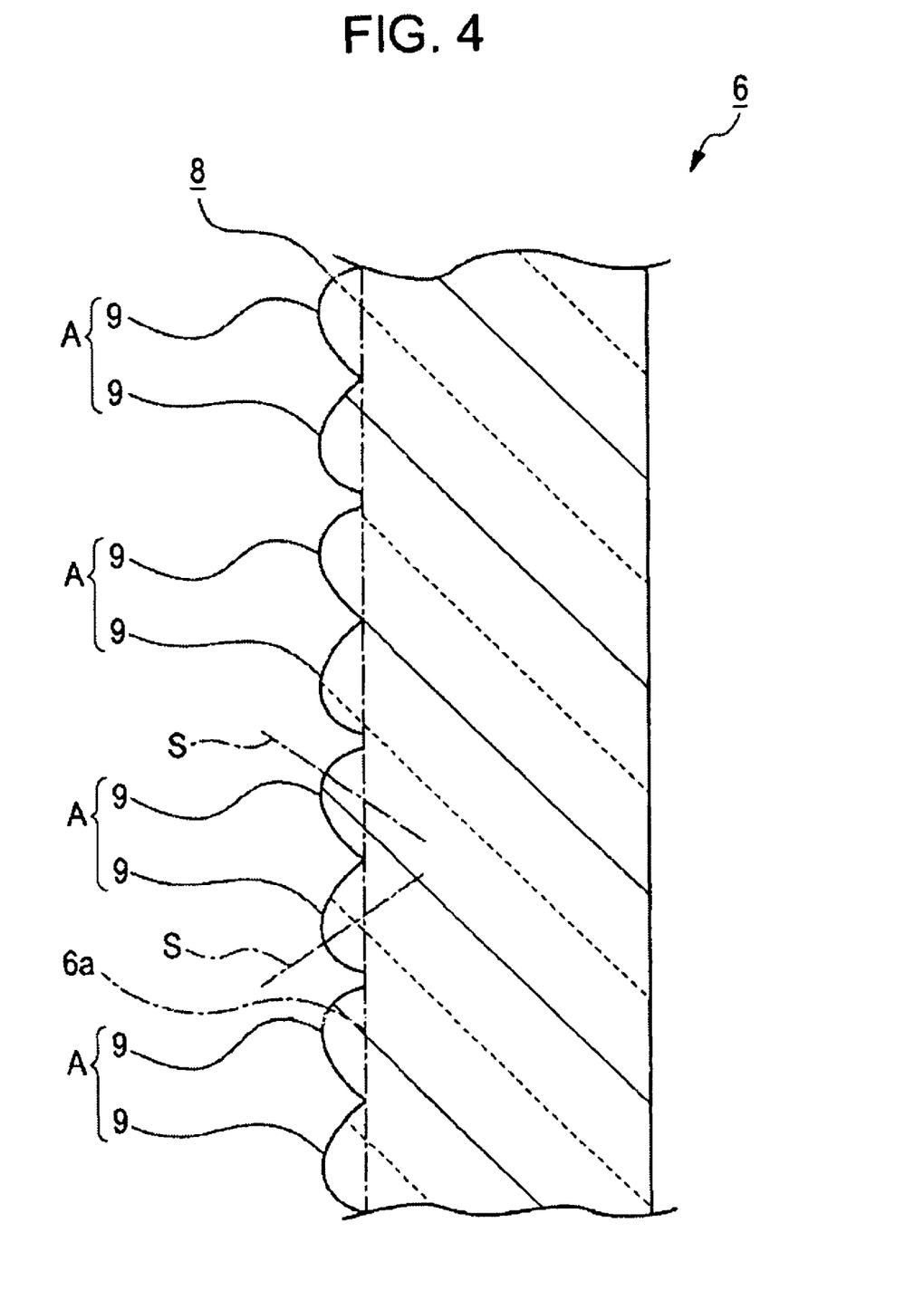
FIG. 4 is a conceptual diagram of another exemplary light-controlling member.
Figure 5:
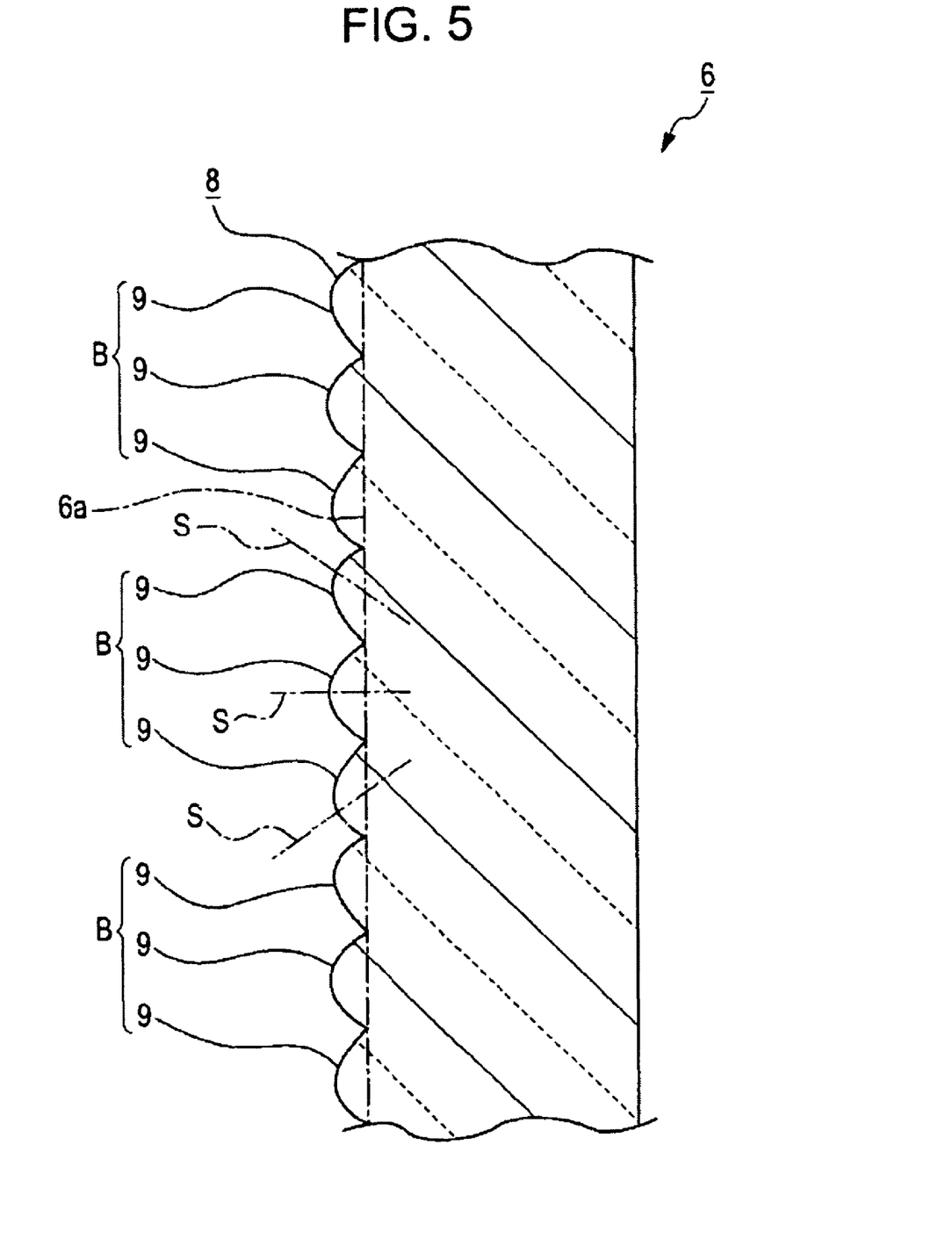
FIG. 5 is a conceptual diagram of yet another exemplary light-controlling member.

The relief structure 8 may include a plurality of ridges 9 having different angles θ. For example, referring to FIG. 4, the relief structure 8 may include continuous patterns A each including a pair of ridges 9 having two respective angles θ. Alternatively, referring to FIG. 5, the relief structure 8 may include continuous patterns B each including a group of ridges 9 having three respective angles θ. The combination of the ridges 9 is arbitrary.

Figure 6:
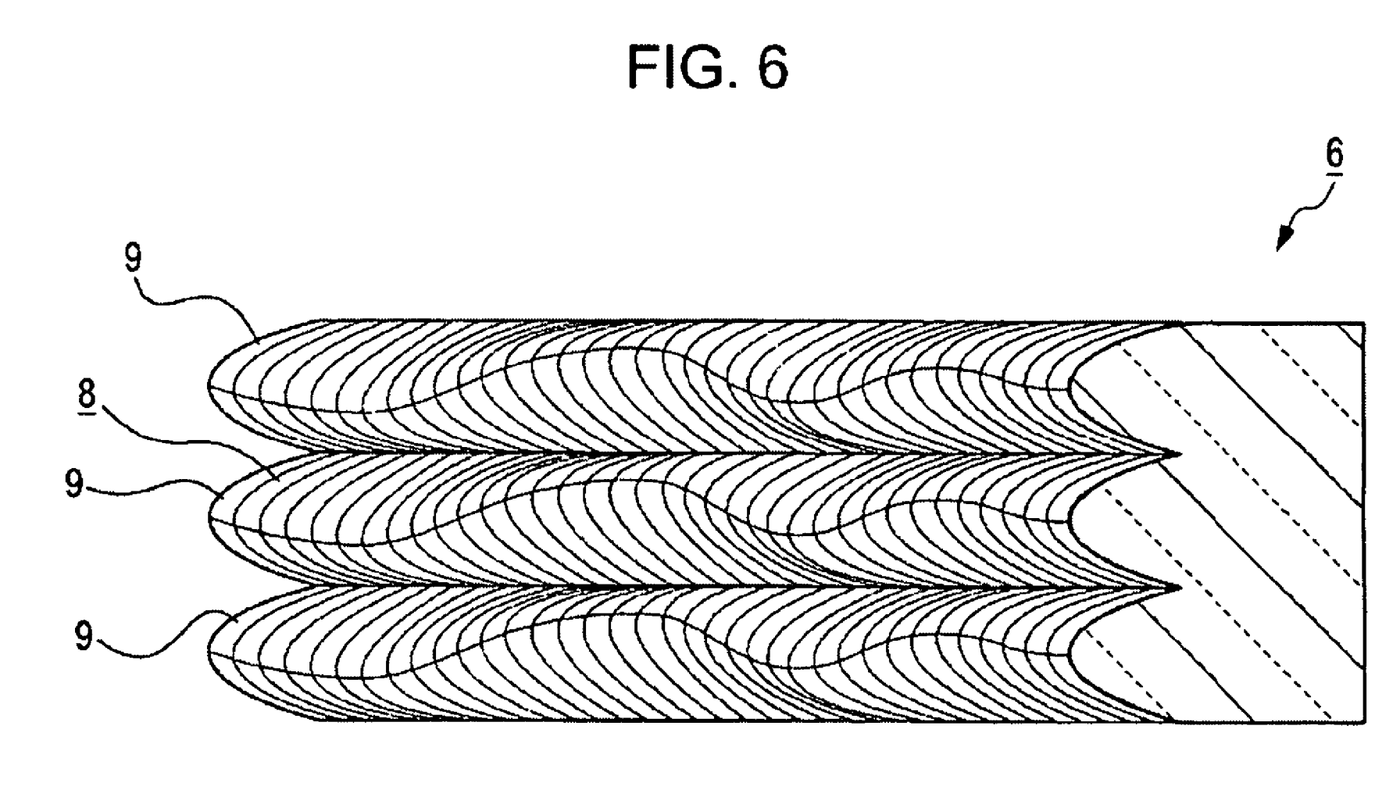
FIG. 6 is an enlarged perspective view of yet another exemplary light-controlling member.

Further, referring to FIG. 6, the relief structure 8 may have a meandering shape in which the angle θ of each ridge 9 gradually changes in the longitudinal direction.

The diffusing member 7 is disposed between the light-controlling member 6 and the display panel 2 and diffuses light emitted from the light sources 5.

It is important that the diffusing member 7 has a sufficient diffusiveness and a low light-absorption rate so as to eliminate the directivity of light output from the light-controlling member 6. To assuredly obtain such characteristics, transparent fine particles are mixed in the base material of the diffusing member 7, the particles having a refractive index different from that of the base material. For example, in a case where the base material is composed of polystyrene, the transparent fine particles are composed of silicon or acryl.

The diffusing member 7 is thinner than the light-controlling member 6 and has a lower rigidity than the light-controlling member 6. Specifically, in a case where the base material of the diffusing member 7 is polystyrene, the thickness of the diffusing member 7 is 0.8 mm or smaller, or more desirably 0.5 mm or smaller.

By setting the thickness of the diffusing member 7 to be smaller than that of the light-controlling member 6 and thus setting the rigidity of the diffusing member 7 to be lower than that of the light-controlling member 6, even if the diffusing member 7 is bent by, for example, vibration transmitted from a speaker and is brought into contact with the light-controlling member 6, noise generated in such an event can be suppressed.

To obtain desired optical characteristics, means for scattering light, including any optical component, may be added in such a manner as to face the output surface of the diffusing member 7. Examples of the means for scattering light include the following: a member including a transparent base material, such as polyethylene terephthalate (PET), and beads scattered and bonded thereonto; and a member including a transparent base material containing light-scattering materials therein. To improve the brightness in the straight ahead direction, a prism sheet, a polarizing reflective sheet, or the like may also be used.

In the image display apparatus 1 configured as described above, light emitted from the light sources 5 enters the light-controlling member 6 and is split thereby into the following: light to be transmitted therethrough, and light to be reflected inside the relief structure 8 and guided toward the reflecting member 4. The light transmitted through the light-controlling member 6 is diffused by the diffusing member 7, travels toward the display panel 2, and is applied to the display panel 2 as backlight. The light reflected toward the reflecting member 4 is reflected by the reflecting member 4, enters the light-controlling member 6 again, is diffused by the diffusing member 7, travels toward the display panel 2, and is applied to the display panel 2 as backlight.

Figure 7:
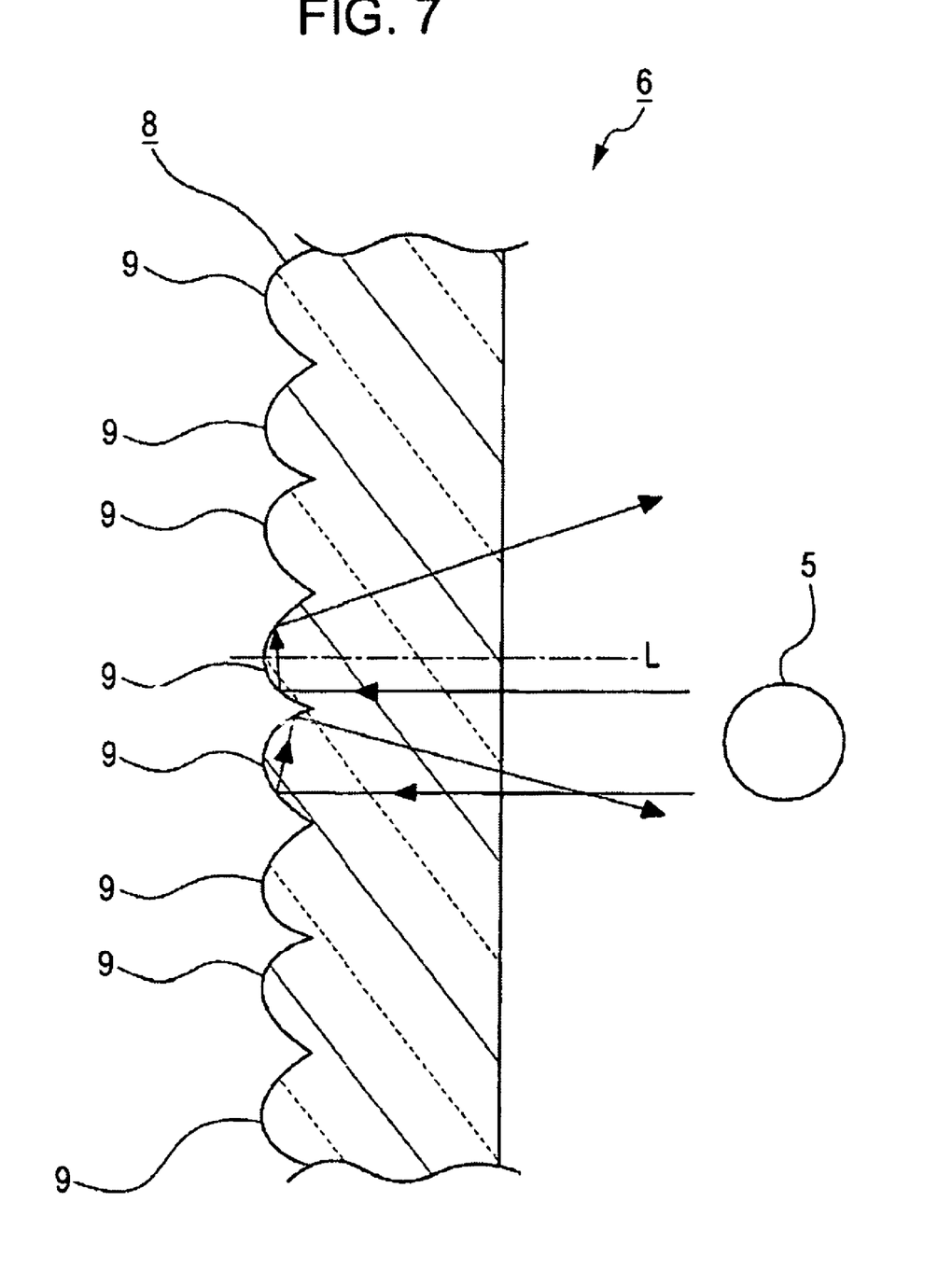
FIG. 7 shows paths along which light emitted from a light source to the light-controlling member is reflected thereinside.

Under such circumstances, referring to FIG. 7, the symmetry axis (symmetry plane) S of each ridge 9 is tilted with respect to the normal L. Therefore, for example, most of light incident from straight behind to the rear surface of the light-controlling member 6 is reflected inside the ridge 9 and travels toward the reflective surface 4*a* along a path tilted with respect to the normal L. Thus, in the light-controlling member 6, each ridge 9 having the symmetry axis (symmetry plane) S thereof tilted with respect to the normal L causes the light to be reflected thereinside and to travel toward the reflective surface 4*a* in a tilted state with respect to the normal L. Accordingly, light can be fed back to regions near each of the light sources 5, and the brightness near each region directly in front of the light source 5 can be improved.

Moreover, in the light-controlling member 6, any of the ridges 9 having the symmetry planes S tilted with respect to the normal L are oriented toward regions of the light-controlling member 6 directly in front of the light sources 5, improving the transmittance near the regions directly in front of the light sources 5.

Therefore, in the surface light source device 3, the brightness at regions directly in front of the light sources 5 and the brightness near the regions directly in front of the light sources 5 are made substantially uniform, whereby nonuniformity in brightness can be reduced.

The surface light source device 3 may also include means for scattering light on the surface of or inside the light-controlling member 6. Examples of the means for scattering light include the following: a member containing a material, such as titanium oxide or barium sulfate, having a certain refractive index; a member containing very small air bubbles; a member serving as a scattering layer by including a film or the like having a light-scattering characteristic; and a member having a rough surface made by sandblasting or the like. By adding such means for scattering light to the light-controlling member 6, the directivity and in-plane brightness distribution of light emitted from the light-controlling member 6 can be made uniform.

The embodiment described above concerns the case where the ridges 9 all have the same shape. Alternatively, the ridges 9 may have different shapes of two or more kinds. In a case where the ridges 9 have different shapes, the difficulty in processing the ridges 9 increases compared to the case where the ridges 9 all have the same shape, but the light diffusivity is preferably improved.

The ridges 9 may either abut on each other or be isolated from each other with spaces interposed therebetween. The lengths of such spaces may be not all the same on the plane of the light-controlling member 6, and may vary with positions, in accordance with factors including the distance from the light sources 5.

The angles θ at which the symmetry axes S of the ridges 9 are tilted with respect to the normal L may be not all the same on the plane of the light-controlling member 6, and may vary with positions of the ridges 9. For example, the angle θ may be smaller than 5 degrees at positions near the light sources 5, and be increased as the distance from the light sources 5 increases. By varying the angle θ in accordance with the position on the light-controlling member 6, precise control of light becomes possible and nonuniformity in brightness can be suppressed.

The embodiment described above concerns the case where the light sources 5 are CCFLs. Alternatively, the light sources 5 may be light-emitting diodes (LEDs), which are point light sources, or the like.

If the light sources 5 are LEDs, two-dimensional light control is to be performed. In such a case, referring to FIG. 8, it is desirable to employ a light-controlling member 6A having a relief structure 8A including substantially conical projections 9A that are arranged in a grid pattern.

Figure 8:
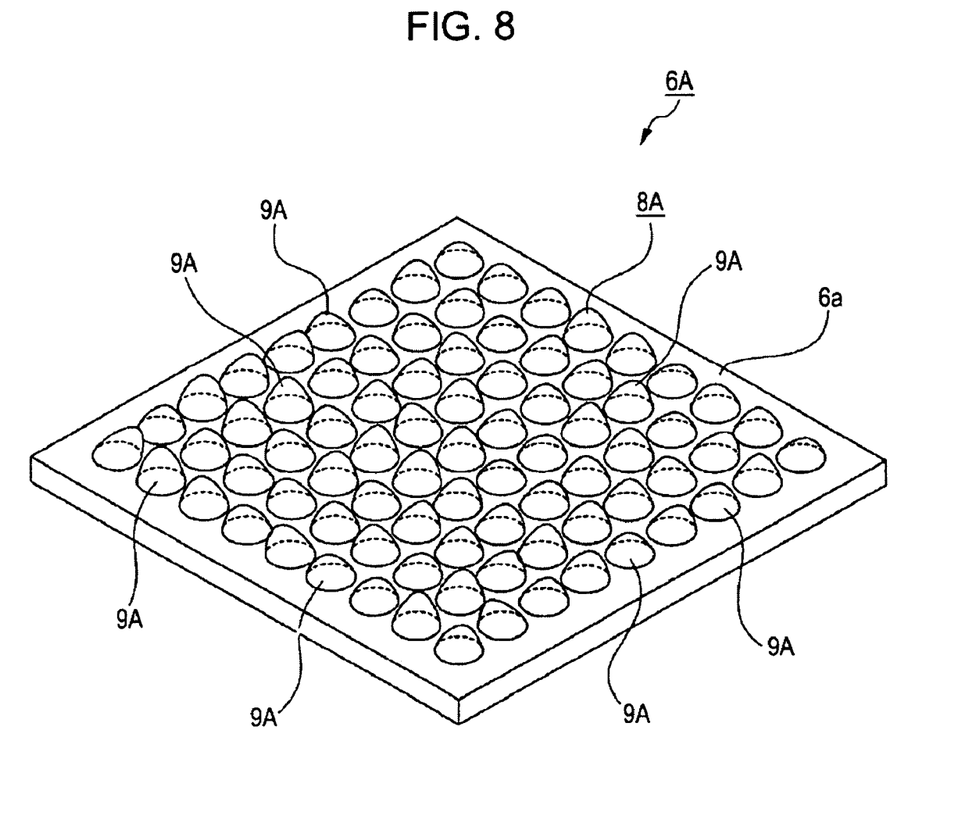
FIG. 8 is a perspective view showing an exemplary light-controlling member in a case where point light sources are used.

As in the case of the light-controlling member 6, conditions for the light-controlling member 6A including the angles θ, the spaces between the projections 9A, and the positions of the projections 9A are all arbitrary, except that each of the projections 9A has a symmetry axis (axis of rotational symmetry) S and the axis S of rotational symmetry is tilted at the angle θ with respect to the normal L.

The specific shapes and configurations of the elements provided in the above description of the preferred embodiments are only exemplary embodiments of the present invention, and do not limit the interpretation of the technical scope of the present invention in any way.

It should be understood by those skilled in the art that various modifications, combinations, sub-combinations and alterations may occur depending on design requirements and other factors insofar as they are within the scope of the appended claims or the equivalents thereof.

What is claimed is:

1. A surface light source device, comprising:
    a light source facing a reflective surface of a reflecting member; and
    a light-controlling member composed of a transparent material and disposed across the light source from the reflecting member in such a manner as to face the reflective surface, the light-controlling member scattering the light emitted from the light source,
    wherein the light-controlling member has on a surface thereof remote from the reflective surface projections arranged on a plane,
    wherein the projections have profiles of at least one kind, each having a symmetry axis or a symmetry plane, and
    wherein the symmetry axes or the symmetry planes of the projections are tilted at a predetermined angle with respect to a direction in which the light controlling member faces the reflecting member.

2. The surface light source device according to claim 1, wherein the predetermined angle at which the symmetry axes or the symmetry planes of the projections are tilted is 20 degrees or smaller.

3. The surface light source device according to claim 1, wherein the predetermined angle at which the symmetry axes or the symmetry planes of the projections are tilted includes a plurality of different angles varying with positions at which the projections reside.

4. The surface light source device according to claim 1, wherein the light source is a light-emitting diode or a fluorescent lamp.

5. The surface light source device according to claim 1, wherein the light source includes a plurality of stick-like light sources extending in a predetermined direction, wherein the plurality of light sources are arranged in a predetermined direction, and wherein the projections of the light-controlling member each extend in the predetermined direction in which the light sources extend.

6. The surface light source device according to claim 1, wherein the light source includes a plurality of point light sources arranged in a grid pattern, and wherein the projections of the light-controlling member are each of substantially conical shape and are arranged on the plane.

7. The surface light source device according to claim 1, wherein the light-controlling member is resistant to ultraviolet light contained in the light emitted from the light source.

8. The surface light source device according to claim 1, further comprising:
    a diffusing member diffusing the light emitted from the light source, the diffusing member being disposed across the light-controlling member from the light source.

9. An image display apparatus, comprising:
    a display panel on which an image is to be displayed;
    a light source disposed on a side with respect to the display panel remote from a display surface of the display panel in such a manner as to face a reflective surface of a reflecting member; and
    a light-controlling member composed of a transparent material and disposed across the light source from the reflecting member in such a manner as to face the reflective surface, the light-controlling member scattering the light emitted from the light source,
    wherein the light-controlling member has on a surface thereof remote from the reflective surface projections arranged on a plane,
    wherein the projections have profiles of at least one kind, each having a symmetry axis or a symmetry plane, and
    wherein the symmetry axes or the symmetry planes of the projections are tilted at a predetermined angle with respect to a direction in which the light controlling member faces the reflecting member.

* * * * *